March 1, 1960  H. L. WELCH  2,926,647
V ENGINE HOT SPOT HEATING SYSTEM AND METHOD
Filed Feb. 1, 1954  3 Sheets-Sheet 2

INVENTOR.
Harold L. Welch.
BY
Harness & Harris
ATTORNEYS.

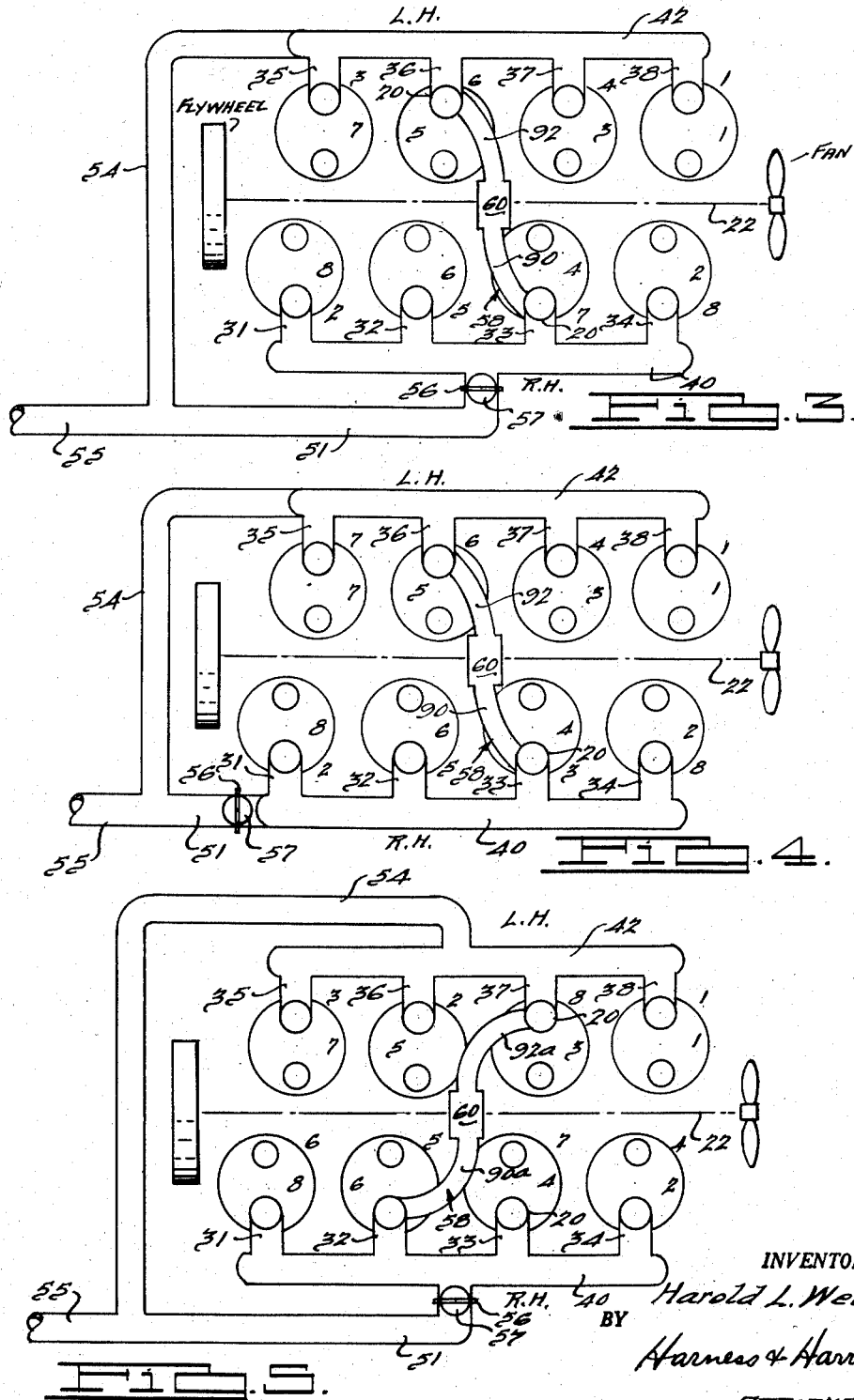

//  United States Patent Office — 2,926,647 — Patented Mar. 1, 1960

2,926,647

V ENGINE HOT SPOT HEATING SYSTEM AND METHOD

Harold L. Welch, Walled Lake, Mich., assignor to Chrysler Corporation, Highland Park, Mich., a corporation of Delaware Application February 1, 1954, Serial No. 407,476

13 Claims. (Cl. 123—122)

This invention relates to methods and structures for effecting heating of the intake manifold hot spot of engines having opposite banks of cylinders for instance, V-type engines, and especially to such methods and structures which facilitate improvement in the torque and power output.

In typical V-8 engines currently used, an intake manifold is positioned intermediate the V-arranged banks of cylinders and an exhaust manifold is provided on the outside of each cylinder bank connecting with each exhaust port of the bank to which it is secured. In such engines it has been common practice to interconnect the exhaust ports of the two middle cylinders of each bank and to interconnect these pairs of exhaust ports by cross passages in the heads and the intake manifold respectively, the latter passing through the intake manifold hot spot. It is further customary to make exhaust pipe or conduit connections with one exhaust manifold at approximately the lengthwise center thereof and a second exhaust pipe or conduit connection at the end of the exhaust manifold of the other bank, rearwardly of the engine, these conduits being in turn connected with each other by a cross pipe and with the muffler. Moreover, a themostatic valve has conventionally been located in the exhaust manifold or pipe of one bank. When this valve is closed, as during engine warm-up, it forces the exhaust gases from that bank through the cross passages aforesaid past the hot spot of the intake manifold. When the valve is open, as when the engine comes up to normal operating temperature, this forced movement is relieved and the natural pulsations of the exhaust system move exhaust gases past the hot spot and heat the same.

It is normally desirable to provide maximum heat in the operation of the intake manifold hot spot during warm-up of a cold engine. However, I have found that after the engine is up to its normal temperature, such high heat at the hot spot is not necessary but in fact is believed detrimental. Thus the conventional hot spot arrangement that permits such a high heat condition after warm up is conducive to a loss in available peak torque in the engine operation. A minimum torque loss results if the exhaust connections to the hot spot are such as to provide good heat for engine warm-up but a minimum heat effect after the engine is up to temperature. To attain these ends I found it best to connect the crossover passage of the hot spot with a single exhaust port of each bank of cylinders. These can be ports of cylinders having any position in the firing order but for reasons which hereafter appear are preferably those of cylinders which do not immediately succeed each other in the firing order.

I have further discovered that in the conventional hot spot arrangement utilizing the exhaust ports of two cylinders of each bank of the engine or even where only two exhaust ports are cross connected but in either case are of cylinders which follow each other in the firing order that the back pressure or exhaust wave of the exhaust event of one of these cylinders interferes with the intake cycle of the other during the overlap period of the intake and exhaust valves of these cylinders and that if this back pressure wave is completely eliminated or substantially neutralized as by sufficiently delaying it so that it cannot adversely affect the intake action of the other cylinder when the heat valve is open, that the peak torque condition may be improved and greater power may be obtained in operation of the engine.

I have discovered that the latter improvement may be conveniently effected by connecting the crossover passage of the hot spot with the exhaust port of a single cylinder of each bank which cylinders do not follow each other in the firing order. Preferably, they are ports of cylinders which are spaced apart in the firing order by at least two other cylinders. Stated in reference to a V-8 engine utilizing a 90° two-plane crank, they are preferably cylinders whose exhaust strokes are 270° of crank rotation out of phase with each other. The only way that an exhaust pressure wave from one of these interconnected cylinders can reach the other is by travelling around over a long path through the exhaust manifold and exhaust conduits. This delays the wave sufficiently in reaching the other cylinder so that it cannot adversely affect the intake action thereof. It may be observed that the improvement in engine output effected by utilizing this feature is much greater than that possible when only a single exhaust port of each bank is interconnected and are of cylinders following each other in the firing order.

I have also discovered that the peak engine torque may to some extent be improved in any of the aforesaid arrangements by making symmetrical conduit connections to the exhaust manifold of the two banks of cylinders. Experimentation has shown that when one bank has a central connection and the other an end connection it adversely affects engine torque.

It is therefore an object of my invention to provide in an engine having opposite banks of cylinders, an intake manifold hot spot providing sufficient heat during the engine warming up operation which gives a minimum heat effect after the heat control valve is open and the engine is up to normal temperature and to effect this by connecting the hot spot with a single exhaust port of each bank of cylinders.

Another object of my invention is to substantially attain the foregoing object while simultaneously substantially eliminating or neutralizing the back pressure effect of the exhaust waves of the exhaust event of one cylinder on the intake event of another due to the hot spot crossover connection between the exhaust ports of such cylinder banks, this by interconnecting the exhaust ports of only cylinders which do not succeed each other in the firing order and which preferably are spaced apart in the firing order by at least two other cylinders.

Another object of my invention is to effect improvement in the peak engine torque of a V engine having a hot spot crossover incorporating any of the foregoing features, by providing symmetrical connections of the exhaust pipes or conduits with the exhaust manifolds of the opposite banks of cylinders.

These and other objects and advantages of my invention will be apparent from the following specification and from the drawings wherein similar numerals designate similar parts of the structure.

In the drawings:

Figure 3 is a schematic view of an engine incorporating one of the features of my invention;

Figure 1:
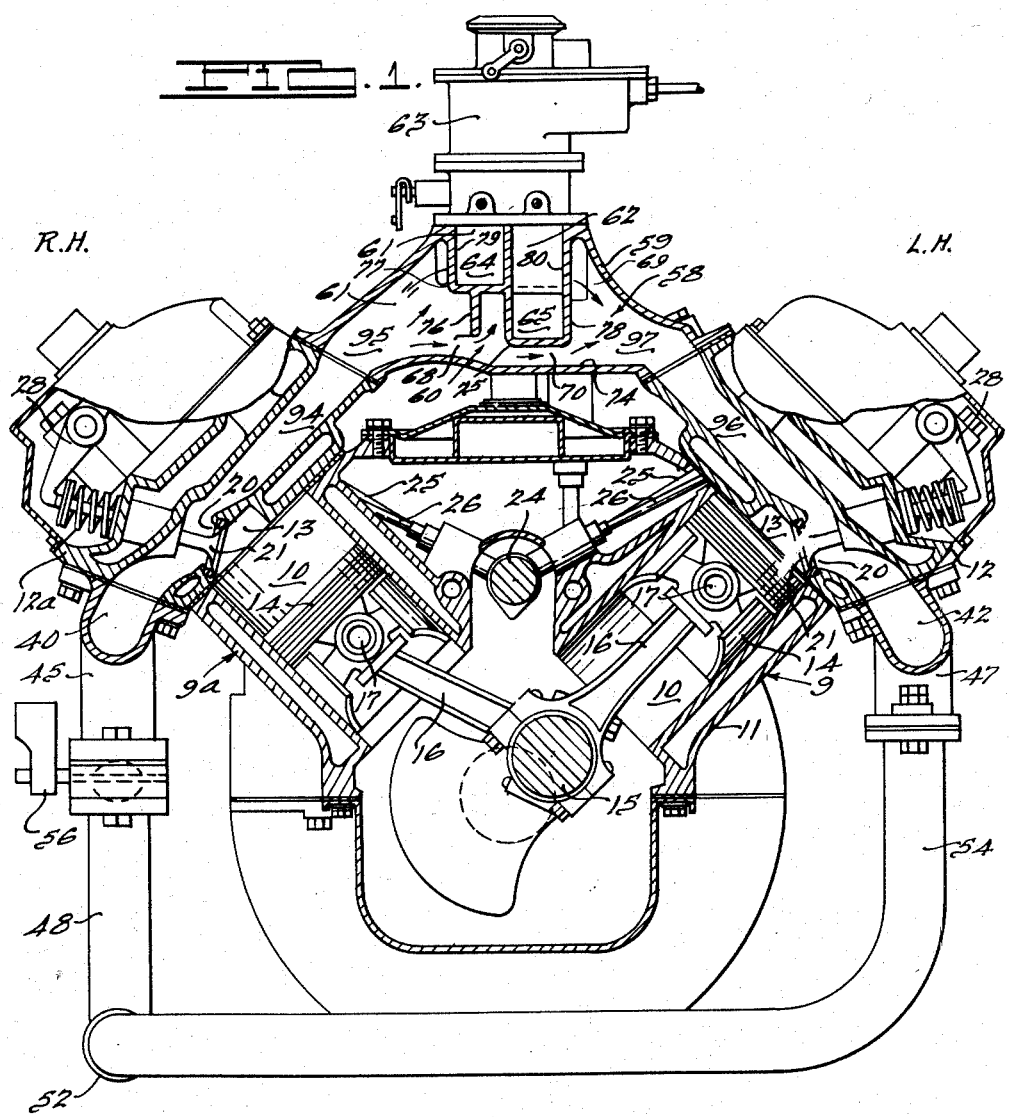
Figure 1 is a transverse section of a V-type internal combustion engine to which my invention is applied and showing the hot spot of the intake manifold system in a crossover passage connecting with the exhaust system of the engine.

Figures 4 and 5 are schematic views of engines incorporating a plurality of features of my invention; and Figures 6 and 7 are schematic views of two suggested two-plane 90° crank pin arrangements for a V engine utilizing my invention, the Roman numerals in the figures indicating the positioning of the crank throws counting from the front or fan end of the engine and the numerals in the parentheses indicating cylinder members whose pistons are connected with the crank throws.

For the purposes of illustration, my invention will be described relative to a 90° V-8 engine of current manufacture having a so-called two-plane 90° crankshaft, hemispherical combustion chambers and provided with downdraft carburetion of the dual type, each riser of which is arranged to feed a pair of inner cylinders of one bank and a pair of outer or end cylinders of the opposite bank. It will be undnerstood, however, that my invention is applicable to other engines having opposite banks of cylinders and having a greater or lesser number of cylinders. Moreover, the carburetion may be of the downdraft, updraft or horizontal types and may be a plurality of these. Also a single plane or other type crank may be used.

As seen in the drawings, the engine has two banks 9 and 9a of cylinders 10, four in each bank, arranged at 90° in a cylinder block 11 to which cylinder heads 12 and 12a are secured and provided with hemispherical combustion chambers 13 immediately above each cylinder 10. The cylinders of each bank are aligned longitudinally of the axis of the engine and the cylinders of the opposite banks are offset longitudinally relative to each other.

For convenient reference, the cylinders of the left hand cylinder bank, which is to the left looking forwardly from the flywheel end of the engine are numbered 1, 3, 5, and 7, respectively starting such numbering at the fan end of the engine, and those of the right hand cylinder bank are numbered 2, 4, 6, and 8 respectively, these numbers appearing internally of the cylinder representations in Figures 2, 3, 4, and 5.

Each cylinder is provided with a piston 14 reciprocable therein and operably connected to a crankshaft 15 through the connecting rod 16 and wrist pin 17. Crankshaft 15 may be of any of the conventional types, but preferably, as seen in Figures 6 and 7, is a 90° two-plane crankshaft wherein the double crank throws identified by the Roman numerals I, II, III, and IV are arranged 90° apart, with throws I and II being respectively opposite throws IV and III. Throw No. I of Figures 6 and 7 connects with the pistons of cylinders 1 and 2, throw No. II with the pistons of cylinders 3 and 4, throw No. III with the pistons of cylinders 5 and 6, and throw No. IV with the pistons of cylinders 7 and 8. In Figure 6 it will be seen that throw No. III will follow throw No. I 90° of crank rotation counting clockwise in that figure and by interchanging throws II and III, throw No. II may be arranged 90° of clockwise rotation from throw No. I.

Figure 2:
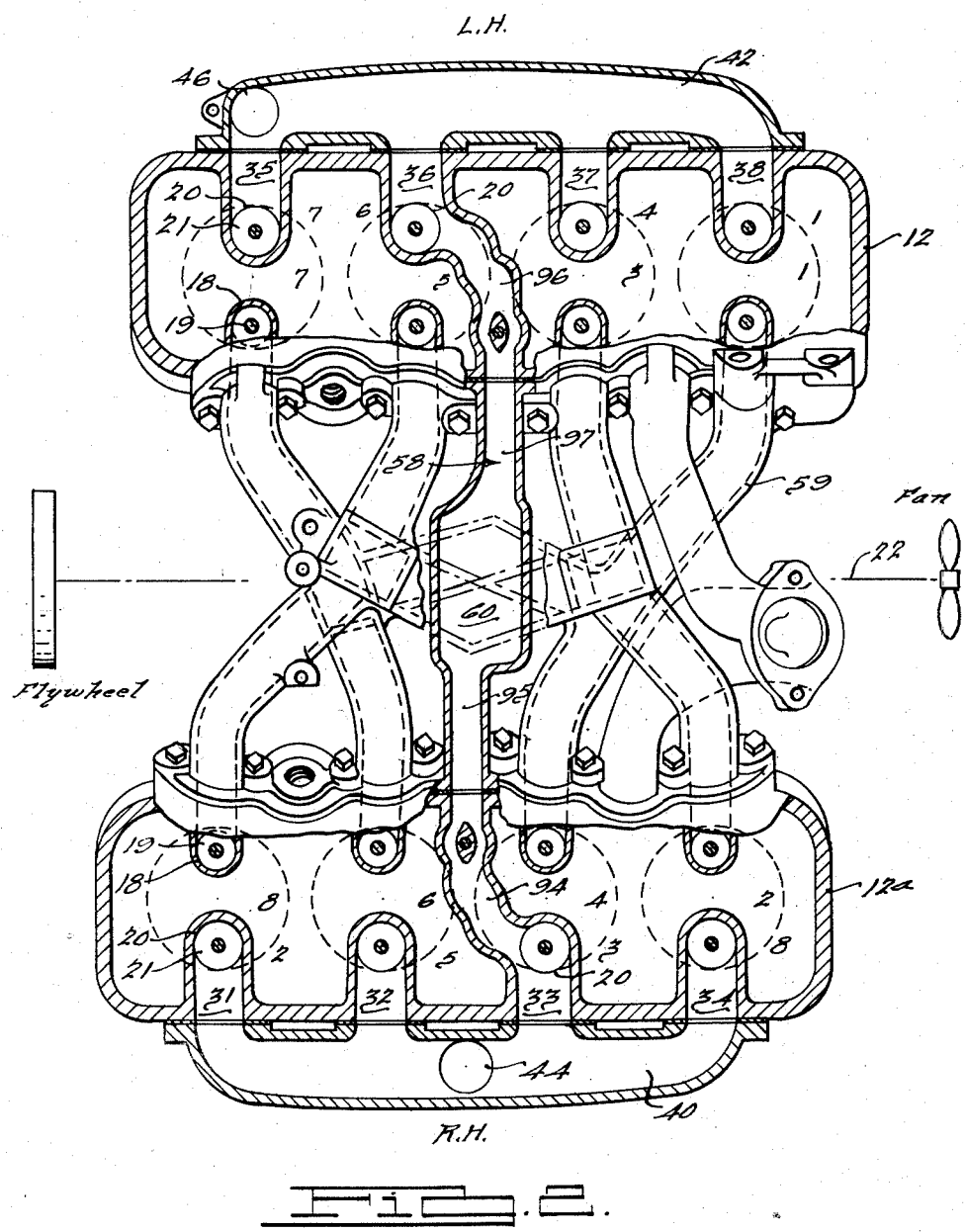
Figure 2 is a top plan view partly in section of the intake and exhaust manifold systems of an engine, such as shown in Figure 1, incorporating my invention.

Various firing orders are possible for the two described crank arrangements while affording preferred feeding intervals in the intake manifold of Figure 2. For example, the following firing orders:

1-5-7-3-6-8-4-2
1-5-4-3-6-8-7-2
1-8-7-3-6-5-4-2
1-8-4-3-6-5-7-2
1-8-4-2-6-5-7-3
1-8-7-2-6-5-4-3
1-5-4-2-6-8-7-3
1-5-7-2-6-8-4-3 may be used with the crank of Figure 6 and firing orders such as:

1-3-7-5-4-8-6-2
1-3-6-5-4-8-7-2
1-8-7-5-4-3-6-2
1-8-6-5-4-3-7-2
1-8-6-2-4-3-7-5
1-8-7-2-4-3-6-5
1-3-6-2-4-8-7-5
1-3-7-2-4-8-6-5 may be used with the crank arrangement of Figure 7.

In Figures 2, 3, 4, and 5 my invention has been shown as applied to an engine having a crank arrangement of Figures 6 and firing orders of 1-8-7-3-6-5-4-2 for Figure 3, 1-8-4-3-6-5-7-2 for Figures 2 and 4, and 1-5-7-2-6-8-4-3 for Figure 5, as will hereafter be more evident. The firing sequence is designated by the numerals just outside the circles in these figures designating cylinders.

The hemispherical combustion chambers 13 of the cylinders 10 are by preference each provided with a single inlet opening or port 18 closed by an inlet valve 19 and with a single smaller exhaust outlet or port 20 closed by an exhaust valve 21, these valves being arranged transversely of the longitudinal axis 22 of the engine and at a substantial angle, for instance 60° to each other, and on a great arc of the spherical segment forming are combustion chamber 13. As seen in Figure 2, all of the inlet openings 18 are in longitudinal alignment and all of the exhaust openings 20 are similarly arranged.

The inlet and exhaust valves of both banks of the engine are operable from a single camshaft 24 located above the crankshaft 15, the camshaft actuating suitable tappet mechanism associated with the push rods 25 and 26 of the inlet and exhaust valve mechanism which in turn actuate respectively the inlet valve rocker arm (not shown) and exhaust valve rocker arm 28, these rocker arms actuating in turn the normally spring-held closed valves 9 and 21.

By preference, the camshaft 24 is usually arranged to open the respective inlet valves 19 before top dead center position of the piston and to close the exhaust valves after top dead center position of the piston so as to maintain the intake valve open during a substantial portion of crank rotation and to maintain the exhaust valve open long enough to obtain an overlap between opening of the inlet valve and closing of the exhaust valve of each cylinder.

As seen in the drawings, each cylinder head has transversely extending, generally parallel, exhaust gas passages 31, 32, 33, 34, 35, 36, 37, and 38 which connect the exhaust valve ports 20 of the cylinders with longitudinally extending exhaust manifolds or collection headers 40, 42 suitably secured to the outer side of the cylinder heads of the right and left cylinder banks respectively.

In Figures 2 and 3, the right hand header 40 has a central outlet passage 44 in the form of a downward pipe extension 45 located intermediate the cylinder group of the right hand bank of cylinders, and the left hand header 42 has a similar outlet passage 46 provided by a downward pipe extension 47 of the header 42 positioned at the rearward end of the header 42.

In Figures 4 and 5 similar connections are made but which in contrast to those of Figure 3 are symmetrically arranged. Thus the connections in Figure 4 occur at one end of each of the headers, preferably the rearward end, and in Figure 5 the connections occur at the mid point of each of the headers.

An exhaust gas conduit or tube 48 connects with the extension 45 and extends downwardly to connect by a longitudinal branch 51 in a T fitting 52 as does a similar pipe 54 which connects with the extension 47 of the header 42. As seen, the pipe 54 projects downwardly from the extension 47, passes beneath the engine transversely thereof, and connects with the fitting 52. A further pipe 55 shown in Figures 3–5 connects with the T fittings aforesaid opposite the longitudinal branch of the pipe 54 and extends to a muffler not shown.

A heat valve 56 of known construction capable of controlling the temperature and velocity of the exhaust gas from the exhaust manifold to the muffler is provided. Such heat valve is by preference located at the intersection on one of the extensions 45 or 47 with their headers 40, 42 respectively. In the drawings this valve is shown positioned at the connection between the conduit 48 and the extension 45. The heat valve 56 is preferably provided with a diaphragm 57, thermostatically controlled, which is normally closed when the engine is cold but permits the hot exhaust gases to be shunted across a tortuous cross passage, generally designated by the numeral 58, formed in part in the intake manifold 59, and in part in the cylinder hads 12, 12a of the cylinder banks 9 and 9a, these hot gases transferring some of their heat to a "hot spot" chamber generally designated by the numeral 60 located intermediate this cross passage 58.

The term "hot spot" as used herein and in the claims is intended to mean a chamber in the intake manifold system to which hot exhaust gases are brought by a connection thereof with the exhaust system of the engine and in which chamber the hot gases are brought into contact with an external surface portion of the air-fuel mixture supply passages of the intake manifold system to supply heat to the air-fuel mixture being fed to the cylinders and which "hot spot" is generally near the point where the air-fuel mixture is introduced into the intake manifold system.

Thus in the engine illustrated in Figures 1 and 2 the "hot spot" chamber 60 is at the intersection of the intake risers 61, 62 (connecting respectively with the riser passages of the dual carburetor 63) with the generally horizontal primary intake passages 64, 65 of the intake manifold. As seen in Figure 2, the hot spot comprises a chamber of generally U shape and generally rectangular section extending longitudinally of the cross passage 58.

The chamber 60 has a vertical branch 67 and a horizontal branch portion 68 bordering on the riser 61 and primary passage 64 and a vertical branch 69 and a narrower horizontal branch portion 70 bordering on the riser 62 and primary passag 65. The floor of the horizontal branches form a substantially continuous flat surface 74 and the ceiling thereof forms a stepped surface 75 which is interrupted by a baffle wall 76. It will be noted that the ceiling surface 75 and the vertical side surfaces 77 and 78 are also the outer surface of wall portions 79, 80 respectively of the riser passages 61, 62, primary passages 64, 65 such that the hot exhaust gases conducted to the "hot spot" heat these wall portions to transfer heat to the air-fuel mixture passing through the passages 61, 64, 62, and 65. The arrows in Figure 1 indicate the general path of the exhaust gases when the heat valve is closed.

As previously described, I have found that the peak torque and/or power performance of an engine having a "hot spot" may be improved in three ways: first by connecting the hot spot with a single exhaust port of each bank of cylinders; secondly, by connecting the hot spot with a single exhaust port of each bank, which ports are those of cylinders which do not follow each other in the engine firing order and which are preferably of cylinders spaced apart in the firing order by at least two other cylinders; and thirdly, by providing the exhaust manifold of the cylinder banks with symmetrical exhaust pipe connections.

In Figure 3 I have shown the hot spot chamber 60 connected with a single exhaust port 20 of each bank i.e., with the exhaust ports 20 and exhaust passages 33 and 36 of the cylinders 4 and 5 by cross passages 90, 92. As seen in Figure 2, the cross passage 90 comprises a passage portion 94 in the cylinder head 12a and a portion 95 in the intake manifold 59 and the cross passage 92 comprises a passage portion 96 in the cylinder head 12 and a portion 97 in the intake manifold 59.

Although the aforesaid "hot spot" connections are relative to an engine illustrated to have a firing order 1–8–7–3–6–5–4–2 such that the crossover passages connect with exhaust ports of cylinders 5 and 4 which follow each other in firing order and although the exhaust manifold exhaust pipe connections in this figure are non-symmetrical I have found that the stated single port connection compensates for any power loss due to the non-symmetrical exhaust manifold connections and even may improve it. The power performance may be further improved by making the exhaust pipe connections to the exhaust manifold of a symmetrical character as seen in Figures 4 and 5.

The power performance may be improved to even a greater extent than by either of the first two featured methods by either eliminating or sufficiently delaying the interference of the exhaust event of one of the interconnected cylinders with the intake event of the other by interconnecting a single exhaust port of each bank which ports are of cylinders which do not follow each other in the engine firing order and preferably are spaced apart by at least two other cylinders in the firing order. As seen in Figure 4, the hot spot 60 is connected with the exhaust ports 20 and exhaust passages 33, 36 of cylinders 4 and 5 respectively, of an engine having a firing order 1–8–4–2–6–5–7–2 from which it will be apparent that the cylinders 4 and 5 are spaced apart by two other cylinders 2 and 6 in the firing order, the cylinders 4 and 5 being in positions 3 and 6 in that firing order. By this arrangement the natural exhaust pulsations of the cylinders 4 and 5 will not interfere with the intake events of each other during the overlap period of the intake and exhaust valves of these cylinders. The only way that the exhaust pressure wave from one of the cylinders 4 and 5 may reach the other is by travelling around through the exhaust manifolds 40, 42 and exhaust pipes 51, 54 which delays the wave sufficiently in reaching the other cylinder so that it cannot adversely affect the intake event of the other cylinder. As a result the power output of the engine is improved.

In Figure 4 the two previously described features have been combined in an engine having symmetrical exhaust manifold connections and such gives the maximum torque and power benefits in operation of the engine.

Figure 5 illustrates an arrangement very similar to that in Figure 4, with this difference, that the hot spot 60 is connected by cross passages 90a and 92a with the exhaust ports 20 and passages 32 and 37 of the cylinders 6 and 3 instead of the cylinders 4 and 5 and in a different firing order 1–5–7–2–6–8–4–3, these cylinders 6 and 3 being numbers 5 and 8 in the firing sequence. Moreover, in this arrangement the exhaust pipes have central symmetrical exhaust pipe connections instead of end symmetrical connections as in Figure 4. The same advantages from the standpoint of torque and power output will be obtained by this arrangement as by that of Figure 4.

Although it will be apparent that the illustrated embodiments of my invention are well calculated to adequately fulfill the objects and advantages described above, it will be understood that the invention is susceptible to variations, modifications and changes which will suggest themselves to those skilled in the art without departing from the spirit or letter of my invention. For example where more than one carburetor is employed and they have individual hot spots, one or more of the above-described features may be applied to each hot spot. These and other variations, modifications, changes and equivalent structures and methods as may come within the scope of the appended claims are accordingly contemplated.

I claim:

1. In an internal combustion engine having oppositely arranged cylinder banks each including a cylinder head and an exhaust valve port for each cylinder thereof, and an intake manifold positioned intermediate said banks and having an intake hot spot; means for conducting hot exhaust gases to said hot spot comprising passage means extending transversely of said heads and intake manifold and connecting said hot spot with a single exhaust port of each bank of cylinders, the said ports being those of cylinders which do not succeed each other in the firing order.

2. In an internal combustion engine having oppositely arranged cylinder banks each including a cylinder head and an exhaust valve port for each cylinder thereof, and an intake manifold positioned intermediate said banks and having an intake hot spot; means for conducting hot exhaust gases to said hot spot comprising passage means extending transversely of said heads and intake manifold and connecting said hot spot with a single exhaust port of each bank of cylinders, the said ports being those of cylinders whose position in the firing order is spaced apart by at least two other cylinders.

3. In an internal combustion engine having opposite V arranged cylinder banks and an intake manifold positioned between said banks, each cylinder bank including a cylinder head, an exhaust manifold and an exhaust port for each cylinder, and said intake manifold including an intake hot spot; means for conducting hot exhaust gases to said hot spot comprising passage means extending crosswise of said heads and intake manifold connecting said hot spot with a single exhaust port of said bank of cylinders, the said ports being those of cylinders whose exhaust strokes are spaced 270° out of phase from each other.

4. In an internal combustion engine having opposite V arranged cylinder banks and an intake manifold positioned between said banks, each cylinder bank including a cylinder head, an exhaust manifold, an exhaust port for each cylinder and a passage connecting each exhaust port with said exhaust manifold, and said intake manifold including an intake riser, branches leading from said riser and a hot spot heating chamber in juxtaposition to the junction of said riser and branches; means for conducting hot exhause gases to said chamber comprising passage means extending crosswise of said heads and intake manifold and connecting said chamber with a single one of said first mentioned exhaust passages of each bank of cylinders, the said passages being those connecting with the exhaust ports of cylinders whose position in the firing order is spaced apart by at least two other cylinders.

5. In an internal combustion engine having opposite V arranged cylinder banks and an intake manifold positioned between said banks, each cylinder bank including a cylinder head, an exhaust manifold and an exhaust port for each cylinder, and said intake manifold including an intake hot spot; means for conducting hot exhaust gases to said hot spot comprising passage means extending crosswise of said heads and intake manifold connecting said hot spot with a single exhaust port of each bank of cylinders, the said ports being those of cylinders spaced 270° of crank rotation from each other in the firing order and symmetrically arranged exhaust conduits connecting with each of said exhaust manifolds of said banks for conducting away exhaust gases.

6. In an internal combustion engine having opposite V arranged cylinder banks and an intake manifold positioned between said banks, each cylinder bank including a cylinder head, an exhaust manifold, an exhaust port for each cylinder and a passage connecting each exhaust port with said exhaust manifold, and said intake manifold including an intake riser and branches leading from said riser and a heating chamber in juxtaposition to the junction of said riser and branches; means for conducting hot exhaust gases to said chamber comprising passage means extending crosswise of said heads and intake manifold and connecting said chamber with a single one of said first mentioned exhaust passages of each bank of cylinders, the said passages being those connecting with the exhaust ports of cylinders whose position in the firing order is spaced apart by at least two other cylinders and exhaust conduit means connecting with each of said exhaust manifolds of said banks at corresponding locations thereon.

7. In an internal combustion engine the combination comprising opposite V arranged banks of cylinders each bank including a cylinder head, an exhaust manifold, an exhaust port for each cylinder and a passage connecting each exhaust port with said exhaust manifold, an intake manifold positioned on said cylinder heads intermediate said banks, said intake manifold having a hot spot chamber, passage means connecting said chamber with exhause ports of cylinders of said banks of cylinders which are cylinders which do not follow each other in the firing order, exhaust muffler means, exhaust conduits connecting with said exhaust manifolds and extending to said exhaust muffler means and a temperature responsive valve means in one of said exhaust manifold and exhaust conduits of one of said banks.

8. An internal combustion engine as claimed in claim 7 wherein the exhaust conduit of each bank is connected to approximately the mid point of the exhaust manifold of its own bank.

9. An internal combustion engine as claimed in claim 7 wherein the exhaust conduit of each bank is connected to an end of the exhaust manifold of its own bank.

10. An internal combustion engine as claimed in claim 9 wherein the said exhaust conduit connections are at the same ends of the exhaust manifold.

11. In an internal combustion engine the combination comprising, oppositely V arranged banks of cylinders, each bank including a cylinder head, an exhaust manifold, an exhaust port for each cylinder and an exhaust passage connecting each exhaust port with said exhaust manifold, an exhaust conduit connecting with each exhaust manifold, a temperature responsive heat valve in one of said exhaust conduits, an intake manifold positioned on said cylinder heads intermediate said banks, said intake manifold including an intake riser and branches leading from said riser, a heating chamber at the junction of said riser and branches, passage means extending crosswise of said heads and said intake manifold connecting said chamber with a single one of said exhaust passages of each bank, the said passages being those connecting with the exhaust ports of cylinders whose position in the firing order is spaced apart by at least two other cylinders.

12. In a method of heating the intake hot spot of an engine having opposite banks of cylinders which comprises firing said cylinders in a predetermined sequence wherein one of said cylinders in one bank fires at least two cylinders later than a second cylinder of the opposite bank and directly conducting the hot exhaust gases from said one and second cylinders only to said hot spot.

13. In a method of heating the intake hot spot of an engine having V arranged opposite banks of cylinders which comprises firing said cylinders in a predetermined sequence wherein one of said cylinders of one bank fires at least 270° out of phase with a second cylinder of the opposite bank and directly conducting the hot exhaust gases of said one and second cylinders only therefrom to said hot spot.

References Cited in the file of this patent

UNITED STATES PATENTS

| | | |
|---|---|---|
| 2,104,178 | Anderson | Jan. 4, 1938 |
| 2,135,628 | Smith | Nov. 8, 1938 |
| 2,160,922 | Sullivan | June 6, 1939 |
| 2,603,199 | Moseley | July 15, 1952 |